May 13, 1958     S. C. GUESS     2,834,420
ELECTRICALLY OPERATED DOOR LOCKING AND WINDOW
CLOSING MEANS FOR MOTOR VEHICLES
Filed March 16, 1955     3 Sheets-Sheet 1
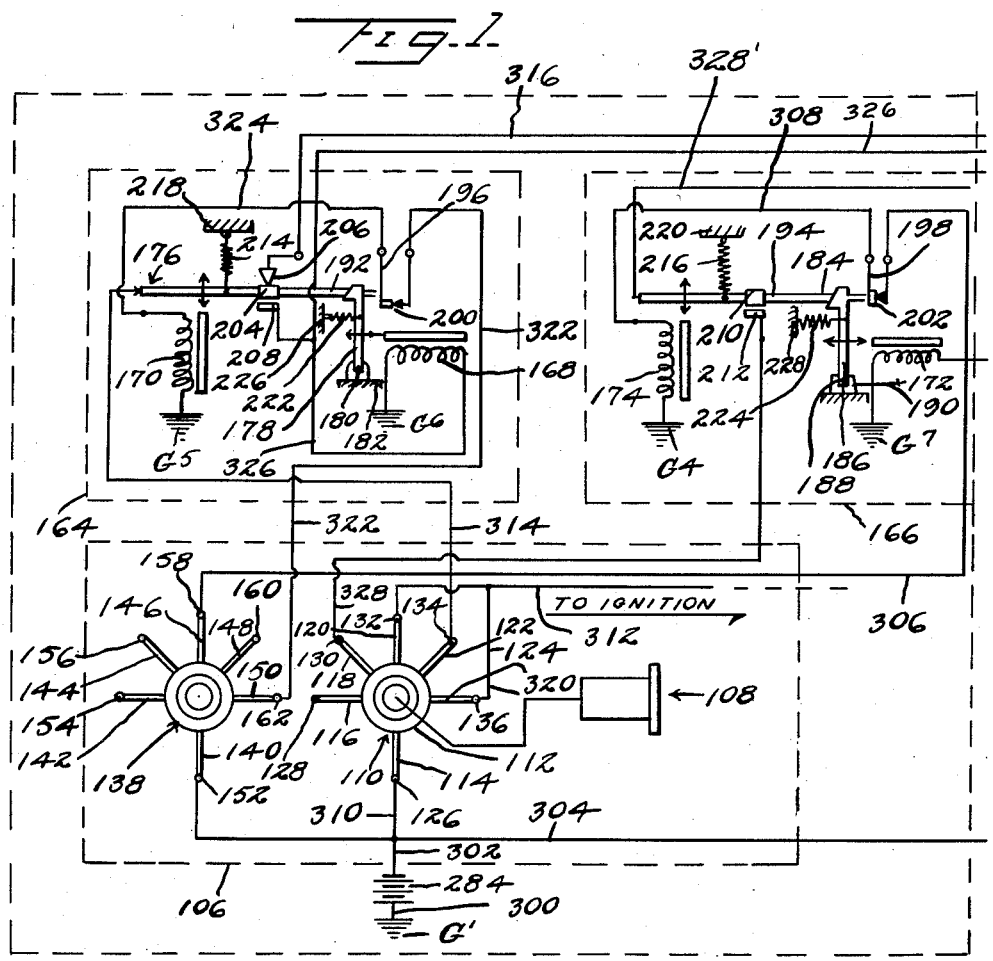
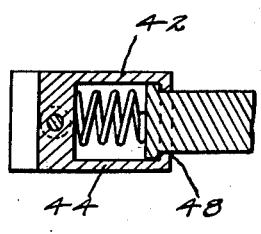
INVENTOR
S. C. Guess
BY *Kimmel & Crowell*
ATTORNEYS

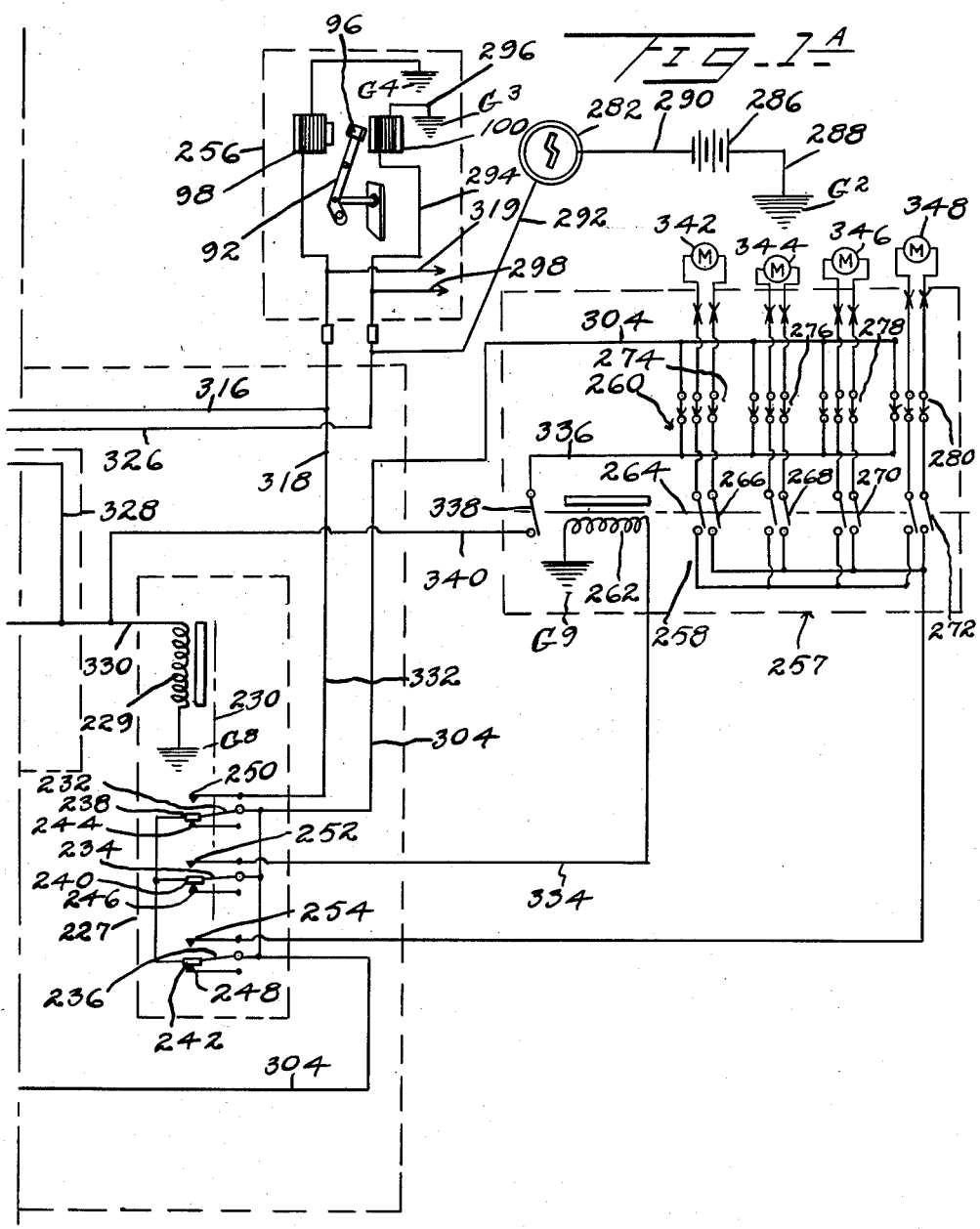

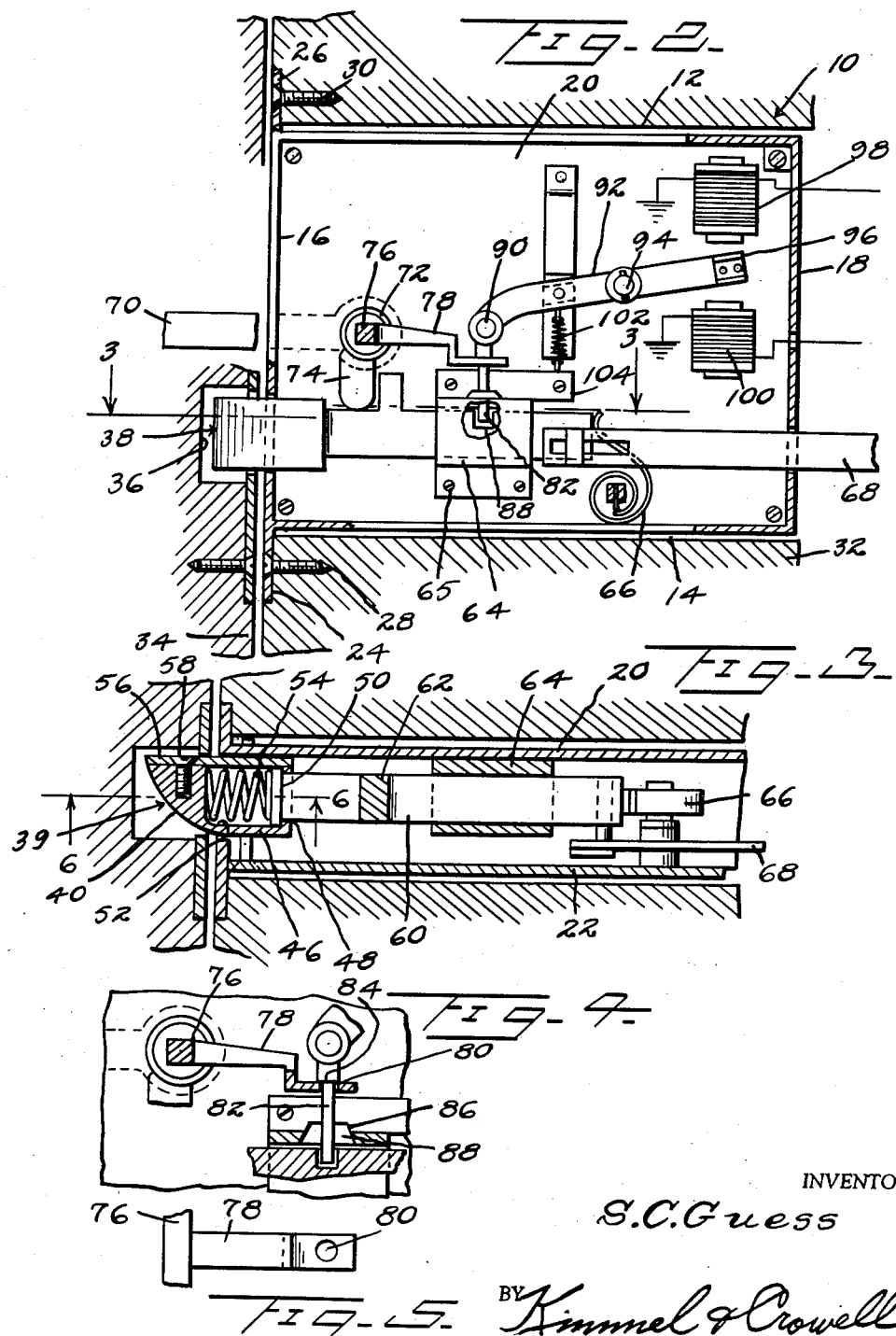

United States Patent Office 2,834,420
Patented May 13, 1958

2,834,420

ELECTRICALLY OPERATED DOOR LOCKING AND WINDOW CLOSING MEANS FOR MOTOR VEHICLES

Shorey C. Guess, Tucson, Ariz.

Application March 16, 1955, Serial No. 494,717

1 Claim. (Cl. 180—82)

This invention relates to door locking and window closing means for vehicles, and more particularly, the invention pertains to means for automatically locking and closing the doors and windows of an automotive vehicle through a control actuated by the ignition key.

One of the primary objects of this invention is to provide means for simultaneously locking the doors and closing the windows of an automotive vehicle, the means comprising electrical circuits in which the ignition key operates the master switch therein.

Another object of this invention is to provide safety means for locking the doors and closing the windows of an automotive vehicle, the means being operable during such periods of time that the ignition is either on or off, and being controlled by the ignition key.

A further object of this invention is to provide means for locking and unlocking the doors of an automotive vehicle from the exterior, the locking and unlocking being accomplished through a plurality of electrical circuits.

A still further object of this invention is to provide means for locking the doors and closing the windows of an automotive vehicle when the ignition thereof is off.

Still another object of this invention is to provide means for unlocking the doors of the automotive vehicle during such time that the ignition is on, and further, to provide means for locking the doors of the vehicle while the ignition is on.

Other and further objects and advantages of the present invention will become more apparent from a consideration of the following specification when read in the light of the annexed drawings, in which:

Figure 1 is a schematic wiring diagram of the electrical control circuits employed in the present invention for effecting the locking and unlocking of the doors of an automotive vehicle and closing the windows thereof.

Figure 1A is a continuation of the schematic wiring diagram of Figure 1.

Figure 2 is a vertical side elevational view of a door lock for an automotive vehicle constructed in accordance with the present invention.

Figure 3 is a transverse cross-sectional view taken on the horizontal plane of line 3—3 of Figure 2, looking in the direction of the arrows.

Figure 4 is an enlarged detail view of the locking pin, partly in cross-section.

Figure 5 is an enlarged top plan view of the locking pin operating lever shown in Figure 4.

Figure 6 is an enlarged fragmentary detail cross-sectional view, taken on the horizontal plane of line 6—6 of Figure 3, looking in the direction of the arrows.

Referring now more specifically to Figures 2, 3, 4, 5 and 6 of the drawings, reference numeral 10 designates, in general, a door lock constructed in accordance with the teachings of the instant invention. The door lock 10 is a modification of the lock shown in the United States patent to J. Pentka, No. 2,061,978, issued November 24, 1936, and is seen to comprise a substantially hollow rectangular housing which includes top and bottom walls 12, 14, end walls 16, 18, and side walls 20, 22. The end wall 16 is provided with a pair of vertically extending flanges 24, 26 which are apertured and receive therethrough screws 28, 30 which secure the housing within a suitable recess formed in the vertically extending lock end 32 of the door frame.

The door jamb 34 is apertured at 36 and normally receives therein the lock bolt head 38. The lock bolt head 38 comprises a housing 39 having an arcuately shaped leading end 40 which is integrally formed with a pair of oppositely disposed top and bottom walls 42, 44 and a side wall 46. The side of the housing opposite the wall 46 is open, and the top, bottom and side walls 42, 44 and 46, respectively, terminate at their respective inner ends in an inwardly turned integrally formed radial flange 48. The flange 48 serves an an abutment for a piston 50 mounted for reciprocation within the cavity 52. Interposed between the piston 50 and the leading end 40 of the bolt head 38 in a resilient spring 54. The open side of the bolt head 38 is closed by a substantially rectangular plate 56 secured thereto as by countersunk screws 58.

The piston 50 is fixedly secured to one end of a bolt 60 having a vertically extending lug 62 fixedly secured thereto. The bolt 60 is slidably mounted in a guide 64 secured to the side wall 20 by conventional means 65, and has the inner end thereof disposed in abutting relationship with a coil spring 66. The coil spring 66 constantly tends to urge the bolt 60 and its associated bolt head 38 toward their respective locking positions. A link 68 has one of its ends connected with the inner end of the bolt 60, and the other end thereof is connected to a conventional door lock operating handle (not shown) disposed within the interior of the vehicle.

Reference numeral 70 designates a conventional outer door lock operating handle having an end thereof fixedly secured to a laterally extending axle 72 to which is connected a roll-back 74. Downward movement of the handle 70 effects a rotation of the roll-back 74 which turns in a counter-clockwise direction and engages the lug 62 to effect the withdrawal of the bolt head from the recess 36. The axle 72 is connected to one end of a cross-shaft 76 from which laterally projects a lever 78. The free end of the lever 78 is apertured at 80 and receives therethrough a latch pin 82 having an upper shoulder 84. In its latching position, as shown in Figures 2 and 4, the pin 82 has an end thereof which extends downwardly through a hollow guide boss 86 comprising a part of the bolt guide 64 and enters a recess 88 formed in the bolt 60.

Thus, as the handle 70 is operated to unlock the door, the lever 78 is simultaneously rotated in a counter-clockwise direction effecting engagement of the lever 78 under the shoulder 84 and raises it out of the recess 88.

The other end of the pin 82 is pivotally connected at 90 to one end of a lever 92 pivotally mounted at 94 on the side wall 20. The other end of the lever 92 has an armature 96 secured thereto for rotation therewith intermediate a pair of electromagnets 98, 100.

The lever 92 has one end of a spring 102 connected thereto intermediate the pivots 90 and 94, and the other end of the spring is connected to an off-set shoulder 104 of the guide 64.

Referring now more specifically to Figures 1 and 1A, the dotted line rectangular construction carrying the reference numeral 106 designates an ignition switch unit which includes a tumbler lock 108 connected for wiping engagement across the contacts of a two wafer, non-shorting switch 110.

The wafer 112 is provided with a plurality of spaced radially extending switch arms 114, 116, 118, 120, 122 and 124 on which are mounted contacts 126, 128, 130, 132, 134 and 136, respectively.

The wafer member 138 of the switch 110 also includes a plurality of radially spaced switch arms 140, 142, 144, 146, 148 and 150 having contacts 152, 154, 156, 158, 160 and 162, respectively, mounted thereon.

The dotted line rectangular outlines 164, 166 designate substantially identically constructed relay switches each of which includes a pair of electromagnets 168, 170, and 172, 174, respectively. The electromagnets 168, 170 are provided with a T-shaped armature 176 common to both and having its stem 178 confronting the electromagnet 168. The outer end of the stem is pivotally mounted at 180 on a suitable support 182. Likewise the electromagnets 172, 174 are provided with a T-shaped armature 184 common to both and having its stem 186 disposed in confronting relationship relative to the electromagnet 172 and its outer end pivotally mounted at 188 on a suitable support 190.

One end of each of the cross-heads 192 and 194 of the armatures 176 and 184, respectively, is disposed in confronting relation relative to the electromagnets 170, 174 respectively. The other ends of the cross-heads 192, 194 are connected with switch arms 196, 198, respectively, of the switches 200, 202.

The cross-head 176 mounts a switch contact 204 which is adapted for engagement, under conditions to be described, with a fixed switch contact 206 or the fixed switch contact 208, and the cross-head 184 carries a switch contact 210 adapted to close with the fixed switch contact 212 under conditions to be set forth below.

Springs 214, 216 have one of their ends anchored to supports 218, 220 and their other ends connected with the cross-heads 176 and 184, respectively, the springs constantly tending to urge their respective T-shaped armatures for pivotal movement in a clockwise direction about their pivots. Springs 222, 224 have one of their ends anchored to supports 226, 228 while their respective other ends are connected to the stems 178, 186. The springs 222, 224 constantly tend to urge the T-shaped armatures for movement in a counter-clockwise direction.

The dotted line rectangular configuration 227 designates a multiple contact electromagnetic relay switch which includes the electromagnet 229 and its armature 230 to which are connected a plurality of switch arms 232, 234 and 236 having contacts 238, 240 and 242, respectively, normally engaging the fixed contacts 244, 246 and 248. When the relay is energized, the contacts 238, 240 and 242 close with the fixed contacts 250, 252 and 254, respectively.

The rectangular dotted line construction 256 schematically designates the electromechanical portion of the door operating mechanism hereinbefore described.

Reference numeral 257 designates a combined multiple contact relay switch 258 combined with a multiple contact torsion relay or limit switches 260.

The relay 258 comprises the electromagnet 262 having an armature 264 connected with and adapted to open and close, en banc, the normally open gang switches 266, 268, 270 and 272.

The torsion or limit switches 260 includes the normally closed gang switches 274, 276, 278 and 280, it being assumed that the vehicle is provided with four doors and a window for each.

Reference numeral 282 designates a vehicle key operated door lock switch.

While two batteries 284, 286, grounded at $G_1$ and $G_2$, respectively, have been illustrated, it will be understood that a single source of e. m. f. could be employed.

It will also be understood that a door locking mechanism 10 is provided for each door, and that all such mechanisms operate in the same manner simultaneously.

The operating cycle of this invention will now be described.

Assuming that the doors and windows of the vehicle are locked and raised, the motor therefor not running, the electrical and mechanical components thereof in the positions illustrated, and the operator of the vehicle being outside thereof, the operator inserts his key in the door lock switch 282 and turns the same to close the contacts thereof. This establishes a series circuit from $G_2$ through wire 288 to one side of the battery 286, and from the other side of the battery 286 to one side of the switch 282 through wire 290. From the other side of the switch 282 the current flows through wires 292 and 294 to one side of the electromagnet 100 which has its other side grounded at $G_3$ through wire 296.

The magnet 100 now being energized attracts the armature 96 and causes the lever 92 to pivot clockwise and in so doing withdraws the latch pin 82 from the recess 88 thus unlocking the door.

Simultaneously therewith current flows from wire 294 through wire 298 to one side of the electromagnet 100 of the other doors (not shown) of the vehicle, these electromagnets also having their other sides grounded.

Thus all of the doors of the vehicle are unlocked simultaneously.

The operator now enters the vehicle and inserts the ignition key in the ignition lock 108. At this point the operator decides whether to drive with the doors unlocked or locked. Assuming the former selection, the ignition key is turned clockwise to wipe the contacts 130, 132 and 158. Current now flows from $G_1$ through wire 300 to one side of the battery 284, from the other side of the battery through wire 302 for connection with wire 304. One end of the wire 304 is connected to the fixed contact 152 to conduct the current through the arms 140, 146 of the wafer 138 to the contact 158. From the contact 158 the current is led through wire 306 to the closed switch 202 and is conducted from the switch 202 through wire 308 to one side of the electromagnet 174. The other side of the electromagnet 174 is grounded at $G_4$. Current also passes through wire 310 to contact 126 and is conducted through the wafer 112 to the contact 132. The contact 132 is connected by wire 312 to the ignition circuit of the vehicle.

Upon energization of the electromagnet 174, the contacts 210, 212 close, the armature 194 having been pivoted counter-clockwise under the influence of the electromagnet 174. However, the switch has wiped past the contact 130 and consequently no current flows therethrough. This pivotal movement of the armature 194 also opens the switch 202 and in so doing deenergizes the solenoid 174. The vehicle is thus conditioned for driving with the doors unlocked.

Assuming now that the operator wishes to operate the vehicle with the doors locked, the lock 108 is rotated to wipe the contact 134. Current now passes through the wire 302 from the battery 284 to the wire 310 and contact 126 of the wafer 112. Current passes through the contact 134 and is conducted therefrom through wire 314 to the armature 192. From the armature 192, the current passes through the closed contacts 204, 206 and is conducted by wire 316 to wire 318. The wire 318 is connected with one side of the electromagnet 98 which has the other side thereof grounded at $G_4$. This energizes the electromagnet 98 which attracts armature 96 which pivots the lever 92 to reinsert the pin 82 in the recess 88. Current is also passed to other armatures 98 (not shown) through wire 319 to effectively lock them. As the lock continues to rotate it wipes the contact 136 connecting the battery 284 through wire 320 with the ignition wire 312.

Also at the same time current flows through wires 302, 304 to the contact 152 of the wafer 138. Current leaves the wafer 138 through the contact 162 which is connected by wire 322 to one side of the closed switch 200. The other side of the switch 200 connects by wire 324 with one side of the electromagnet 170 having its other side grounded at $G_5$. This energizes the electromagnet 170 and causes the armature 192 to pivot in a counter-clockwise direction to open the switch 200 and to break the engagement between the contacts 204 and 206, while at the same time establishing the engagement of the contact 204 with the contact 208.

The energization of the electromagnet 98 causes the lever 92 to pivot in a counter-clockwise direction forcing the latch pin 82 into the recess 88 thereby locking the bolt 60 against longitudinal movement thereof. It will be recognized, of course, that the opening of the contacts 204, 206 destroys the electrical circuit to the electromagnet 98, and leaves established only the circuit to the ignition.

When the operator's destination has been reached and the operator desires to leave the car, he turns the ignition key to its off position. This action wipes the contact 134 sending current through the wire 314 to the armature 192. The contacts 204 and 208 having been closed, current passes through wire 326 to one side of the electromagnet 168, the latter being grounded at $G_6$, and simultaneously therewith, current passes through wire 326 to momentarily energize the magnet 100 thereby unlocking the doors.

The electromagnet 168 being energized attracts the armature 192 and causes the same to move in a clockwise direction. This closes switch 200 and effects re-engageemnt of the contacts 204, 206. At the same time current flows through the wire 316 which is connected with the wire 318 effecting energization of the electromagnet 98. As has been seen before, energization of the electromagnet 98 effects attraction thereto of the lever 92 thereby latching the doors.

As the ignition key is turned to its off position, the contacts 132 and 158 have been wiped which permits current to pass through the wire 306 to the open switch 202.

The contact 130 will also have been wiped which enables the current to flow through the wire 328 to the engaged contacts 210, 212 of the armature 194. From the contacts 210, 212, the current passes through the armature 194 to the wire 328' which is connected with the electromagnet 172 grounded at $G_7$. The energization of the electromagnet 172 pivots the armature 184 in a clockwise direction separating the contacts 210, 212 and closes the switch 202.

Simultaneously, the electromagnetic switch 229 is energized through wire 330 which connects with wire 328, the electromagnet being grounded at $G_8$. Energization of the electromagnet 229 closes the switch contacts 250, 238, 240, 252 and 242, 254.

As is seen in Figures 1 and 1A, the wire 304 connects with the switch arms 232, 234 and 236, and upon the closing of the above-mentioned contacts, current passes to the wire 332 which energizes the locking electromagnet 98.

The current also passes through wire 334 to one side of the electromagnet 262 which is grounded at $G_9$. Upon energization of the latter switch, the same initiates a holding circuit for the relay switch 229 which may be led from the battery 284, wires 302, 304, through one side of the torsion or limit switches 260 and from the other side of the torsion or limit switches through wire 336 across the now closed switch 338 and wire 340 connected with the aforementioned one side of the relay switch 229.

Energization of the electromagnet 262 causes its respective armature 264 to move and close the gang switches 266, 268, 270 and 272.

The torsion or limit switches 274, 276, 278 and 280 are presumed to be in their closed position, and the output sides thereof are connected with the window raising motors 342, 344, 346, 348. Energization of these motors will operate the window raising mechanism if the windows are open. Current continues to pass through the motors if all of the windows have been closed at which time the torsion switches 274, 276, 278, 280 will open. The opening of all of the torsion switches deenergizes the holding circuit to the electromagnet 229 and the gang switches thereof are then automatically opened.

It is to be understood that the limiting or torsion switches 274, 276, 278 and 280 are of such type that each or all of the switches automatically close when any one or all of the windows are opened. Conversely, the opposite is also true.

The automatic closing of the windows and the locking of the doors occurs only when the ignition key is turned to its off position. However, while the operator is driving the vehicle with the doors locked, the windows may be opened or closed by any occupant in the vehicle or by the driver through the manipulation of the master switch at the driver's door or by the individual switches on each door without interfering with any of the features of the instant invention. The raising and lowering of the windows under such condition is achieved through circuits heretofore well known in the art.

Having described and illustrated one embodiment of this invention, it will be understood that the same is offered merely by way of example, and that the invention is to be limited only by the scope of the appended claims.

What is claimed is:

The combination of an automotive vehicle of the type having door latches including latching bolts having means associated therewith for positively locking said bolts in latching position, a plurality of window raising motors, and an ignition circuit with an electric control circuit, a switch in said electric control circuit and having portions thereof simultaneously controlling said ignition circuit, electromagnetic means in said electric circuit for moving said latch bolt locking means into locking engagement therewith, electromagnetic means for moving latch bolt locking means out of locking engagement therewith, electromagnetic means for simultaneously energizing said motors, said switch being adapted when turned through a plurality of predetermined select positions to actuate said latch bolt locking means, said latch bolt unlocking means, said motor energizing means and said ignition circuit both singly and in preselected combinations, a latching head telescopically mounted on said latch bolt, means on said latch bolt for retaining said head thereon, and a spring normally biasing said head in a latching direction whereby said head may move in an unlatching direction to permit said door to close with said bolt in locked condition.

References Cited in the file of this patent

UNITED STATES PATENTS

| | | |
|---|---|---|
| 1,816,504 | Ulrich | July 28, 1931 |
| 1,901,721 | Beal | Mar. 14, 1933 |
| 2,061,978 | Pentka | Nov. 24, 1936 |
| 2,105,830 | Aiken | Jan. 18, 1938 |
| 2,153,088 | Knell | Apr. 4, 1939 |
| 2,505,401 | Ingres et al. | Apr. 25, 1950 |
| 2,576,816 | Wahlberg | Nov. 27, 1951 |
| 2,621,037 | Riedel | Dec. 9, 1952 |
| 2,696,981 | Ayers | Dec. 14, 1954 |